4,137,279  1/1979  Smith et al. .......................... 525/49

United States Patent [19]
Gardner

[11] 4,293,686
[45] Oct. 6, 1981

[54] THERMOSETTING POLYESTER RESIN COMPOSITION

[75] Inventor: Hugh C. Gardner, Somerville, N.J.

[73] Assignee: Union Carbide Corporation, New York, N.Y.

[21] Appl. No.: 141,311

[22] Filed: Apr. 18, 1980

[51] Int. Cl.³ .................. C08G 63/02; C08G 63/54
[52] U.S. Cl. .................. 528/192; 260/40 R;
  525/36; 525/39; 525/40; 525/43; 525/48;
  525/49; 525/438; 525/445; 528/194; 528/303
[58] Field of Search .................. 525/445, 438, 36, 39,
  525/40, 43, 48, 49; 528/192, 194, 303; 260/40 R

[56] References Cited

U.S. PATENT DOCUMENTS

| | | | |
|---|---|---|---|
| 2,812,313 | 11/1957 | Nischk et al. .......................... | 525/36 |
| 2,813,055 | 11/1957 | Nischk et al. .......................... | 525/34 |
| 2,824,821 | 2/1958 | Nischk et al. .......................... | 525/27 |
| 3,692,736 | 9/1972 | Besnard et al. ........................ | 260/40 R |
| 3,721,642 | 3/1973 | Schalin et al. ........................ | 260/40 R |
| 3,723,390 | 3/1973 | Carpenter et al. ..................... | 528/304 |
| 3,736,278 | 5/1973 | Wada et al. ............................ | 260/22 CB |
| 3,766,129 | 10/1973 | Pesez .................................. | 260/40 R |
| 3,784,586 | 1/1974 | Thomas et al. ............ | 204/159.15 X |
| 4,102,944 | 7/1978 | Fukuyama et al. .................... | 525/48 |

FOREIGN PATENT DOCUMENTS 2000494  1/1979  United Kingdom .

*Primary Examiner*—Lucille M. Phynes
*Attorney, Agent, or Firm*—Donald M. Papuga

[57] ABSTRACT

This invention comprises a polymerizable composition of a liquid mixture of (a) an unsaturated polyester, (b) a half ester characterized by the following empirical formula:

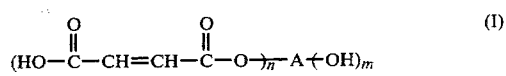

wherein n is a number having an average value of about 1.5 to less than about 4, m is equal to the free valence of A less the average value of n, A is the hydroxyl-free residue of an organic polyol which contained from 2 to 4, inclusive, hydroxyl groups, OH, in formula (I), (c) maleic anhydride and (d) an ethylenically unsaturated monomer. This composition is suitable for use in the manufacture of fiber reinforced plastic compositions.

33 Claims, No Drawings

THERMOSETTING POLYESTER RESIN COMPOSITION

This invention is directed to polymerizable compositions which can be employed in the manufacture of shaped articles, and particularly in the manufacture of fiber-reinforced plastic compositions (FRP).

Fiberglass has been widely used as a reinforcement in the manufacture of thermoset molded articles. These types of articles have been termed "Glass Reinforced Plastics" (GRP) and "Glass Fiber Reinforced Plastics" (GFR).

Unsaturated polyester resins are used primarily as the resin component in many of these glass reinforced thermoset plastics. They consist of unsaturated polyesters dissolved in a polymerizable ethylenically unsaturated monomer. Typically, these unsaturated polyesters are formed by reacting an unsaturated diacid (or anhydride) with a nearly equivalent amount of dihydric alcohol at temperatures above about 200° C. for several hours. Maleic anhydride is the most common unsaturated acid component utilized. The dihydric alcohols which are commonly used to make these polyesters include ethylene glycol, 1,2-propylene glycol, dipropylene glycol, diethylene glycol, and the like. Modifying amounts of other diacids or anhydrides, such as phthalic acid or anhydride, isophthalic acid, terephthalic acid, or adipic acid are also commonly employed. Unsaturation which is provided by maleate or fumarate groups within the backbone of the polyester takes part in the crosslinking, or curing, of unsaturated polyester resins.

Typically, unreinforced castings of polyester resins are brittle and unsuitable for use in load bearing applications. They are generally combined with fiber and fillers to give compositions with increased stiffness and strength. Two types of processes for forming fiber reinforced products are in general use, i.e., wet lay up and thickened processes. Wet lay up processes include the following: pre-impregnation of a fibrous mass with resin, followed by compression molding; preforming, in which cut fiber and resin are sprayed onto a mold form itself; mat molding; in which liquid resin is poured onto a mat while the mat is disposed in a composition mold; bulk molding, in which a non-thickened mixture of staple fiber and polyester resin are poured into a mold.

In thickened processes, carboxyl groups on the polyester react with an inorganic alkaline earth metal oxide or hydroxide such as, magnesium oxide and calcium hydroxide. This reaction increases the viscosity of the fiber-containing resin so that it has a non-liquid pastelike quality. The mixture of resin, filler, and fibers can then be handled and deposited within the framework of a mold to achieve a more uniform and more convenient molding. However, thickened bulk molding compounds have not been widely used in injection molding since their viscosities are normally higher than is desirable for effective molding. Also, the equipment required to mold the high viscosity thickened bulk molding compound is extremely expensive, large, and cumbersome to operate. A further disadvantage in using thickened bulk molding compounds in an injection molding process is that the fibers must be of very short length in order to effectively distribute the fiber throughout the mold and minimize fiber breakage during injection. The short lengths of the fibers minimizes the reinforcement, so that the resulting molded article does not have optimum performance characteristics particularly, strength properties.

Recently, a series of glass fiber reinforced polyester compositions have been developed which utilize the thickening characteristics of SMC, BMC, and the like, but which contain extremely high concentrations of glass fiber. For example, a series of polyester compositions containing from about 50 to about 75 weight percent of glass fibers have been developed. These polyester compositions can be used in making molded products. Their strength characteristics, which are supplied by the high concentrations of glass fibers, provide unique markets for these materials. The fibers in these compositions are either unidirectionally aligned, as from continuous filament tow, or are randomly distributed in a polyester mat, or from a combination thereof, to supply enhanced multidirectional strength to the molded article. The high glass fiber reinforced molding compounds are designated XMC, HMC, (XMC and HMC are trademarks of PPG Industries, Inc.) and MSMC-R-Fiber content such as 50–65, (trademarks of Owens Corning Fiberglass Corp.). They are molded primarily by compression molding procedures.

A novel process for producing fiber reinforced compositions is described in U.S. patent application Ser. No. 035,011 entitled "Molding Process and Apparatus Therefore", and filed on May 1, 1979 now abandoned in the name of R. Angell, Jr., which is incorporated herein by reference. In this application a process for rapidly fabricating fiber reinforced thermoset resin articles is described. The fiber reinforcement is comprised of one or more fibers with a melting point or a transition temperature above about 130° C. The process comprises the steps of (a) providing in a heatable matched metal die mold, a bonded web of one or more of said fibers, (b) providing in an accumulator zone, a liquid body of a thermosettable organic material having a viscosity determined at 120° C., in the absence of curing agent therefore, of less than about 50 centipoises, and which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom. The fiber reinforcement may be from about 15 to about 80 weight percent of the weight of the molded article which is removed from the mold.

The process, as described in said U.S. patent application Ser. No. 035,011, does not require a maturation step. The need for thickening in the resin formulation is thus eliminated. A major requirement for the process is low resin viscosity to avoid movement of the reinforcing fibers during resin injection. Many types of resins can be used in the resin injection process described in said application Ser. No. 035,011, including polyesters, epoxides and polyurethanes.

Unsaturated polyesters of the type utilized in thickened processes are suitable provided that their viscosities are sufficiently low. Typically, the desired viscosity is achieved by diluting the resin used in thickened processes with additional ethylenically unsaturated monomer.

Another type of suitable resin is described in U.S. patent application Ser. No. 034,995, filed May 1, 1979, now abandoned, in the names of H. C. Gardner et al. and titled "Half Esters of Organic Polyols and a Process For Their Production". This application describes a composition comprising a homogeneous liquid mixture of (a) a half ester of an organic polyol characterized by the following empirical formula:

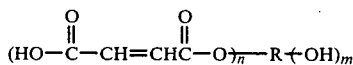

wherein n is a number having an average value of about 1.8 to less than about 4, m is equal to the free valence of R less the average value of n, R is the hydroxyl-free residue of an organic polyol which contained from 2 to 4, inclusive, hydroxyl groups, OH, in the formula, (b) maleic anhydride, (c) an ethylenically unsaturated monomer which forms a liquid homogeneous mixture with and is copolymerizable with the half ester and maleic anhydride, and (d) a basic compound.

The resin suitable for use in the resin injection process in said application Ser. No. 035,011 is characterized as a liquid having a low viscosity and a fast cure speed. Unsaturated polyester resins have such characteristics. However, it is desirous to improve the properties of composites produced from injecting these thermosetting resins according to the process of said application.

U.S. Pat. No. 3,766,129 issued Oct. 16, 1973, describes pre-impregnated materials containing reinforcing fibers impregnated with a composition composed of an unsaturated polyester (a polycondensate), an oligoester having terminal maleic acid groups, and at least one ethylenically unsaturated monomer, which composition contains at least one polymerization initiator and one or more oxides or hydroxides of metals of Group II of the periodic classification of elements. The Group II oxide or hydroxide is a necessary component in the composition described in U.S. Pat. No. 3,766,129 since it is required for thickening.

However, such a composition is not suitable for use in the resin injection process of Ser. No. 035,011 described, supra, since the thickening reaction between the carboxyl group in the resin and the Group II oxides or hydroxides results in viscosities that are too high for resin injection.

THE INVENTION

This invention is directed to a novel composition comprising a blend of an unsaturated polyester, a particular "half-ester", as described herein, maleic anhydride and an ethylenically unsaturated monomer.

It has been found that when fiber-reinforced composites are molded by the resin injection process from said novel compositions, the mechanical properties of the composite are significantly improved as compared to the mechanical properties of a composite molded from a composition containing only an unsaturated polyester and an ethylenically unsaturated monomer. This is surprising since the properties of unreinforced castings of the composition of the instant invention and compositions containing only the unsaturated polyester and ethylenically unsaturated monomer are similar. Further, cured articles formed from the compositions of this invention have improved environmental resistance as compared to cured articles formed from compositions containing only half-ester, maleic anhydride, and ethylenically unsaturated monomer.

The compositions of this invention do not require the oxides or hydroxides of the metals of Group II as is required in the compositions of U.S. Pat. No. 3,766,129. The compositions of this invention are thus free of ionic crosslinking. Since the instant compositions do not utilize oxides or hydroxides, they are especially suited for use in an injection molding process such as that described in Ser. No. 035,011, supra.

The polymerizable composition of this invention comprises a liquid mixture of (a) an unsaturated polyester, (b) a half ester characterized by the following empirical formula:

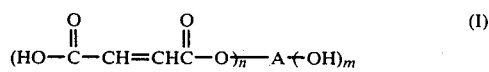

wherein n is a number having an average value of about 1.5 to less than about 4, m is equal to the free valence of A less the average value of n, A is the hydroxyl-free residue of an organic polyol which contained from 2 to 4, inclusive, hydroxyl groups, OH, in formula (I), (c) maleic anhydride and (d) an ethylenically unsaturated monomer which forms a homogeneous mixture and is polymerizable with (a), (b) and (c).

The thermosetting unsaturated polyesters suitable for use herein are well known commercially available materials as described, supra. They are typically the condensation product of a diol with a difunctional carboxylic acid or anhydride. The diol is generally selected from ethylene glycol, diethylene glycol, propylene glycol, dipropylene glycol, neopentyl glycol, and alkoxylated derivatives of bisphenol-A, 2,2,4-trimethyl-1,3-pentanediol and 1,3-butanediol. The unsaturated acids include maleic acid and fumaric acid. Saturated acids, which may be used in modifying amounts include phthalic acid, isophthalic acid, terephthalic acid, and adipic acid. Anhydrides of the above, such as maleic anhydride and phthalic anhydride are often used. Additionally, mixtures of diols and unsaturated and saturated acid components can be used.

The unsaturated polyesters are generally prepared by heating approximately equimolar amounts of the diol with the carboxylic acid or anhydride at temperatures in excess of about 200° C., for periods of 4 to 24 hours. The polyesters have number average molecular weights ($\overline{M}n$) in the range of from about 500 to 5000, and they contain unsaturation distributed along the chain. The unsaturation is normally in the form of fumarate diesters. These polyesters have acid numbers in the range of about 8 to 50. (The acid number is the milligrams of potassium hydroxide needed to neutralize one gram of sample). Many of the polyesters have hydroxyl numbers approximately equal to or greater than their acid numbers. The unsaturated polyesters, as described herein, are present in commercially available polyester resins.

The mechanical properties of cured samples of neat polyester are influenced by the choice of diol and proportion of saturated to unsaturated diacid in the polyester. Commercial polyester resins containing diols such as diethylene glycol or dipropylene glycol have greater toughness than the corresponding polyester resins made with ethylene glycol or propylene glycol.

Polyesters modified by isophthalic acid and phthalic anhydride show increased toughness as compared to polyesters based on maleic anhydride as the sole diacid. Isophthalic acid is preferred over phthalic anhydride as a modifier, since its use results in improved properties.

It has been found that composites made by resin injection based on a class of polyesters, from the tougher products containing isophthalic acid and, for example, diethylene or dipropylene glycol to the more brittle resins not containing toughening modifiers, exhibit enhanced properties when the half esters described above are combined with the polyesters.

The half ester of the organic polyol in this invention is characterized by the following empirical formula:

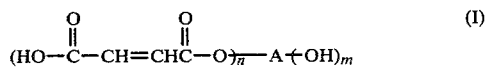

This half ester is formed by the reaction of maleic anhydride and an organic polyol. The reaction product contains at least 1.5 ester groups. If the polyol contains 4 hydroxyl groups, the reaction product can possess up to 4 half ester groups. If the number of half ester groups is less than the number of hydroxyl groups available from the polyol, the reaction product will contain residual hydroxyl groups. Typically, the maleic anhydride content of the composition does not exceed a total of about 20 mole percent of the amount of maleic anhydride employed in producing the half ester.

The organic polyol which is reacted with maleic anhydride to form the half ester depicted by empirical formula (I), is typically a polyol which contains at least two carbon atoms and which may contain from 2 to 4, inclusive, hydroxyl groups. These polyols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, 2,2-dimethyl-1,3-propanediol, polypropylene glycol having an average molecular weight of about 150 to about 600, and having 2 to 4 terminal hydroxyl groups, triethylene glycol, 1,4-cyclohexanedimethanol, 2,2-dimethyl-3-hydroxypropyl 2,2-dimethyl-3-hydroxypropionate, triethanolamine, 1,3-butanediol, tetraethylene glycol, 2,2-bis(4-hydroxyphenyl) propane and the ethylene and propylene oxide adducts of 2,2-bis(4-hydroxyphenyl)propane, pentaerythritol, erythritol, glycerine, trimethylolpropane, 1,4-butanediol, 1,6-hexanediol, tripropylene glycol, 2,2-bis(4-hydroxycyclohexyl)propane, 1,2,6-hexane triol, 1,3-propanediol, the polycaprolactone ester of a polyol in which from about 1 to about 5, preferably from about 1.5 to about 4.0 moles of caprolactone are esterified with a polyol, such as trimethylol propane or diethylene glycol, preferably the polycaprolactone ester of a polyol is the polycaprolactone ester of trimethylol propane in which about 1.5 moles of caprolactone are reacted with trimethylol propane or the polycaprolactone ester of trimethylol propane where about 3.6 moles of caprolactone are esterified with trimethylol propane, and the like. The most preferred organic polyols are 2,2-dimethyl-3-hydroxypropyl 2,2-dimethyl-3-hydroxypropionate, 2,2,4-trimethyl 1,3-pentanediol, propylene glycol, dipropylene glycol, and the ethylene oxide and propylene oxide adducts of 2,2-bis(4-hydroxyphenyl) propane. The use of mixtures of the aforementioned polyols in producing half esters is very desirable.

The half esters (I) in this invention have molecular weights which range from about 250 to about 900. The acid numbers of the anhydride/polyol reaction products of this invention range from about 70 to about 500. Preferably, the acid number is between about 100 to about 390.

The half ester (I) and maleic anhydride mixture is formed by the reaction of the polyol with maleic anhydride. The polyol and maleic anhydride are typically combined in a molar ratio of one mole of maleic anhydride per mole of hydroxyl groups in the absence of a solvent. The mixture of polyol and maleic anhydride is heated at 60° and 110° C. for one to five hours. These conditions are sufficient to convert more than 75 percent of the original charge of the anhydride to half esters. When a catalytic amount of a basic compound is added to the mixture of reactants, the reaction time can be reduced to less than 30 minutes.

It is also possible to prepare the maleic anhydride/polyol reaction product directly in the presence of the polymerizable monomer. In this process, a liquid mixture is prepared by blending maleic anhydride, a polyol, an ethylenically unsaturated monomer and a polymerization inhibitor at a temperature of from about 15° to about 60° C. To this mixture it is desirable to add a catalytic amount of a basic compound. The basic compound catalyzes the in situ formation of half esters from the reaction of the polyol and maleic anhydride. The time needed to react more than 70 percent of the maleic anhydride ranges from about 5 minutes to a few days.

In preparing the polyol/anhydride reaction product, the reaction equilibrium between maleic anhydride and organic polyol favors maximum reaction of maleic anhydride at the lowest temperature. When effecting the reaction at elevated temperature, viz, 80° C., an equilibrium composition in which about .80 percent of the maleic anhydride is reacted with the organic polyol to produce the half ester may be achieved within a reasonable time period. When the reaction mixture is cooled to about room temperature, viz, 23° C., more maleic anhydride reacts with the organic polyol and a conversion of more than about 85 mole percent of maleic anhydride is achieved.

The base in the maleic anhydride/polyol reaction is selected from an amine or a metal salt of an alcohol or carboxylic acid, or a metal oxide or hydroxide.

The metal salt of the alcohol includes sodium methoxide, potassium ethoxide and lithium isopropoxide. The metal salt of a carboxylic acid includes sodium acetate and potassium benzoate. The metal oxide or hydroxides include the alkali metal hydroxides such as potassium hydroxide, and sodium hydroxide. Magnesium oxide is an example of a suitable metal oxide. Characteristic of all the bases which are suitable for use in this invention is that when 1 gram of the basic compound is dissolved in 100 milliters of water the pH is greater than 7.

A preferred basic compound is a secondary or tertiary amine. These amines have a $pK_b$ in the range of 3 to 12.

Amines suitable for use in the practice of this invention include the following:

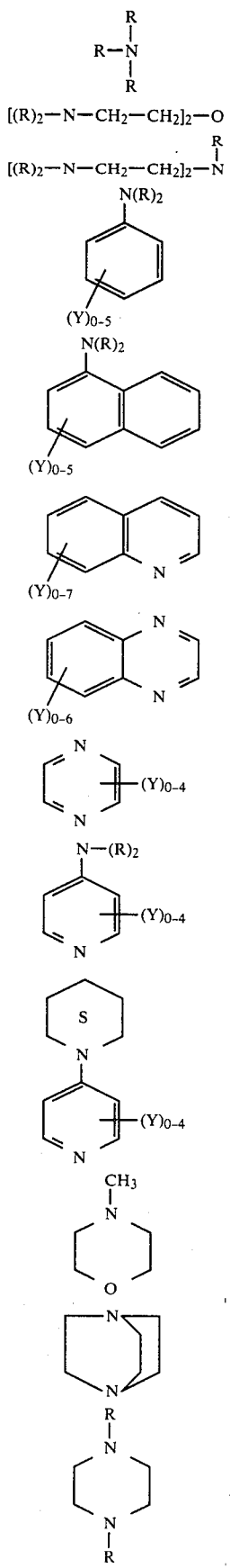

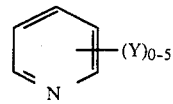

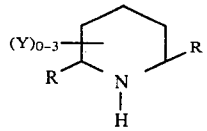

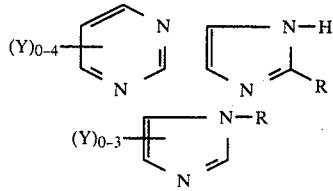

wherein the R's are independently selected from alkyl of 1 to 8 carbon atoms such as $CH_3$, $C_2H_5$, $C_3H_7$, $C_4H_9$, and aralkyl of 7 to 15 carbon atoms such as

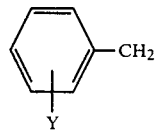

Y is independently selected from alkyl of 1 to 4 carbon atoms, alkoxy of 1 to 4 carbon atoms and halogen.

Additional amines suitable for use herein include 1,5-diazabicyclo[5.4.0]-undec-5-ene; 1,5-diazabicyclo[4.3.0]-non-5-ene.

The preparation of the polyol/anhydride reaction mixture may be carried out under subatmospheric, atmospheric, and superatmospheric pressure conditions. However, atmospheric pressure conditions are generally used.

The maleic anhydride/polyol reaction is desirably conducted in the absence of water. It is frequently impossible, in a practical operation of this process, to insure that all of the reactants will be absolutely dry and the atmosphere in which the reaction is conducted is totally free of moisture. However, in the practical operation of the present process, water in an amount equivalent to that which could theoretically convert one weight percent of the maleic anhydride used in the reaction to maleic acid can be tolerated. This is preferably considered to be the maximum amount. In the usual case water is present in a relatively trace amount resulting in considerably less than 4 weight percent of the maleic anhydride being reacted to maleic acid.

To insure that the amount of water that gets into the reaction is as low as feasible, it is desirable to utilize an inert moisture free atmosphere in carrying out the reaction. This moisture free atmosphere can be provided by relatively dry gases such as dry nitrogen, carbon dioxide, methane, helium, argon, and the like.

In carrying out the anhydride/polyol reaction, it is desirable to mix the reactants. The degree of mixing is not critical and gentle stirring of the reaction mass is sufficient. To avoid any complications in the reaction, it is desirable to effectively disperse the basic catalyst, if used, throughout the composition.

The ethylenically unsaturated monomer employed in the composition of this invention is one which forms a liquid homogeneous mixture and is polymerizable with the unsaturated polyester, the half ester structure depicted by formula (I), and maleic anhydride.

Suitable ethylenically unsaturated monomers which may be employed in the practice of this invention are one or more monomers which contain a —CH=C<- group, and preferably a $CH_2$=C< group. These monomers include styrene and its derivatives and homologues, diallyl phthalate, divinylbenzene, acrylic acid or methacrylic acid and their derivatives, such as their esters, amides or nitriles, e.g., methyl acrylate, methyl methacrylate, n-butyl methacrylate, acrylamide, methacrylamide, acrylonitrile, methacrylonitrile, and the like. Also the monomers include vinyl esters and esters, e.g. vinyl acetate, vinyl propionate, methyl vinyl ether, and the like, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene since it has the most significant commercial utilization for such purposes.

The composition of this invention contain the following proportions of components:

(a) The unsaturated polyester is present in amounts of from about 70 to about 2, preferably from about 65 to about 5 weight percent;

(b) From about 2 to about 70, preferably from about 5 to about 65 weight percent of the maleic anhydride/polyol reaction product (i.e. the half ester of formula (I) plus maleic anhydride). The molar ratio of half ester to maleic anhydride ranges from about 3:1 to about 200:1, preferably from about 6:1 to about 100:1. In the most typical embodiment, the mole ratio of half ester to maleic anhydride is from about 10:1 to about 30:1.

(c) The ethylenically unsaturated monomer is present in amounts of from about 20 to about 80, preferably from about 25 to about 60 weight percent.

The compositions of this invention are desirably produced by effecting an intermixture of the maleic anhydride/organic polyol reaction product, an ethylenically unsaturated monomer and the unsaturated polyester. A convenient method of preparing the instant compositions is by blending an unsaturated polyester resin with the maleic anhydride/organic polyol reaction product and additional ethylenically unsaturated monomer. Blending may be readily carried out at ambient temperature.

The compositions of this invention are liquid mixtures at temperatures ranging from about 20° C. to about 70° C.

Certain low molecular weight polyols, such as dipropylene glycol, form half-esters (I) which have limited solubility in the ethylenically unsaturated monomer. However, the half esters of these low molecular weight polyols find greater utility in the compositions of this invention since the unsaturated polyester solubilizes the half-ester in the ethylenically unsaturated monomer.

The liquid mixtures of this invention typically possess room temperature viscosities in the range of about 10 to about 300 centipoises with 50 weight percent of an ethylenically unsaturated monomer, such as styrene. Preferably, with this monomer level, the solution viscosities are between about 15 and about 150 centipoises.

The composition of this invention can be cured by azo and peroxide curing agents such as those which are described by Gallagher, et al. "Organic Peroxides Review", Plastics Design & Processing, July 1978, pages 38–42, and August, 1978, pages 60–67, inclusive. The Technology disclosed in those two articles is incorporated herein by reference. The choice of the specific peroxide or azo initiators to effect a desirable cure is generally characterized in the aforementioned articles.

Illustrative of a few such catalysts are 2,2'-azo-bis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperoctate, t-butylperneodecanoate, t-butylperbenzoate, t-butylpercrotonate, t-butyl perisobutyrate, di-t-butyl perphthalate, and the like.

The concentration of the curing agent is not critical and can be varied within wide limits. As a representative range, the concentration can vary from about 0.1 to about 5 wt.% based on the weight of the total resin composition.

In order to avoid premature reaction in the composition it is desirable to add polymerization inhibitors to the reaction mixture. These polymerization inhibitors include tertiary butyl catechol, hydroquinone monomethyl or monoethyl ethers, benzoquinone, tertiary-butyl hydroquinone, methyl hydroquinone and mixtures thereof, such as mixtures of hydroquinone monomethyl ether and benzoquinone. These polymerizati on inhibitors are used in amounts of from about 30 to about 600 parts per million by weight.

The compositions of this invention can be cured neat or in combination with fibers, such as fiberglass, carbon fibers and aromatic polyamide fibers (such as aramid fibers sold by E. I. DuPont Nemours, Wilmington, Delaware under the trademark Kevlar), hollow glass or phenolic resin spheres, and the like.

Mold release agents or lubricants, such as zinc stearate, calcium stearate, and others known to the art may also be used herein.

The compositions of this invention are particularly useful for the manufacture of rigid fiber reinforced molded articles. A preferred procedure for producing a molded article from this composition is described in the process of U.S. patent application Ser. No. 035,011, supra.

In said U.S. patent application Ser. No. 035,011 the apparatus for producing the molded article comprises (a) a heatable matched metal die mold containing one or more cavities therein with means for opening said mold to expose said cavities, and means for controlling the injection of a thermosettable organic liquid to said cavities when the mold is closed, (b) means associated with said mold, whereby an interlocked mass of fibers is provided in a portion of the cavity thereof, when the mold is open to receive such cavities and prior to the injection of thermosettable organic liquid to such cavities when the mold is closed, (c) accumulator means associated with said mold which can contain a thermosettable organic liquid transportable to means for controlling injection of said thermosettable liquid to such cavities, (d) cooling means associated with the means for controlling the injectin of such liquid to such cavities, whereby the temperature of the liquid in such injection means is maintained substantially below the temperature of the mold.

Due to the low viscosities of the compositions of this invention, they readily flow through and about and within the total confines of the mold and the fibrous material contained therein to effect a uniform distribution of the reaction product within the ultimate molded product.

EXAMPLES

The following examples serve to illustrate specific embodiments of this invention and it is not intended that the invention shall be limited by the examples.

CONTROL A

A 4-necked, 2 liter flask equipped with a paddle stirrer, nitrogen inlet and outlet, a thermometer, and an electric heating mantle was charged with 408.52 g of molten 2,2-dimethyl-3-hydroxy propyl 2,2-dimethyl-3-hydroxypropionate and 392.24 g of molten maleic anhydride. The solution was heated to 110° C., and held at this temperature by removing the heating mantle and applying a cooling bath until the reaction exotherm subsided. The heating mantle was replaced and the temperature was maintained at 110°±5° C. for 1.2 hours. The mixture was then cooled to room temperature and poured into a jar for storage. A sample was titrated in aqueous pyridine. The acid number was 316 mg of KOH/g. Proton NMR analysis of the product, 16 days later, indicated that the maleic anhydride derived components consisted of 90.6 percent maleates (almost exclusively the maleate half ester with less than 5 percent maleic acid or maleate diester) and 9.4 percent of unreacted maleic anhydride. No fumarate-containing products were detected.

CONTROL B

A 3 liter, 4-necked flask fitted with a paddle stirrer, nitrogen inlet and outlet, and a thermometer was charged with 547.3 g of dipropylene glycol and 800 g of maleic anhydride. The mixture was warmed to 43° C., and 5.23 ml (0.4 weight percent) of 1-methylimidazole was added by syringe to the rapidly stirred mixture. Immediately the reaction mixture changed from colorless to dark brown. The temperature of the mixture was raised to 120° C. over the next 18 minutes by the intermittent application of heat. Twenty minutes after addition of the catalyst, a sample was removed for analysis by titri metric methods. The amount of unreacted maleic anhydride present was 23 percent of the original charge. The temperature of the reaction was gradually decreased from 120° C. to 63° C. over the next 60 minutes. At the end of this period, a sample was removed for NMR analysis, which showed that the distribution of maleic anhydride containing products was as follows:

- 88 mole percent maleates (half ester, diester, and maleic acid),
- 0.5 mole percent fumarates,
- 11.5 mole percent unreacted maleic anhydride.

Less than 2 percent of the original maleic anhydride charged was present as either maleic acid or maleate diesters.

CONTROLS C TO G

The procedure of Control A was repeated except that a series of polyols, as described in Table I, were reacted with maleic anhydride in a molar ratio of one mole of maleic anhydride per mole of hydroxy groups, in the presence of a catalyst, at the temperature and for the reaction times described in Table I. The reactions were carried out until at least 85 percent of the anhydride had reacted. The major products were maleate half esters. In none of these reactions, was more than 5 percent of the anhydride converted to either maleic acid or maleate diesters. The products were yellow to brown oils or glasses at room temperature.

TABLE I

| Example | Polyol Reacted Type | Catalyst Type | Amount(wt %) | Reaction time(hrs) | Reaction Temperature (°C.) |
|---|---|---|---|---|---|
| Control C | 2-mole ethoxylate of 2,2-bis(4-hydroxyphenyl)propane | — | — | 4 | 90 |
| Control D | 2-mole propoxylate of 2,2-bis(4-hydroxyphenyl)propane | Sodium methoxide | 0.1 | 5 | 70-91 |
| Control E | Mixture of 2,2,4-trimethyl 1,3-pentanediol/and propylene glycol (75/25)<sup>a</sup> | 1-methylimidazole | 0.2 | 5 | 55-80 |
| Control F | Mixture of 2,2-dimethyl-3-hydroxypropyl 2,2-dimethyl-3-hydroxypropionate and dipropylene glycol (75/25)<sup>a</sup> | 1-methylimidazole | 0.2 | 28 | 55-90 |
| Control G | Mixture of 2,2-dimethyl-3 hydroxypropyl 2,2-dimethyl-3-hydroxypropionate and a polycaprolactone ester of trimethylol propane containing approximately 3.6 moles of caprolactone (51/49)<sup>a</sup> | 1-methylimidazole | 0.2 | 6 | 60-90 |

<sup>a</sup>These numbers represent a weight ratio.

The following Examples 1 to 6 describe formulations of a blend of a polyester, a maleic anhydride/polyol reaction product, and styrene.

CONTROL H

A thermosetting resin composition was prepared by mixing 1000 g of a polyester resin containing 30 weight percent styrene (MR 14017 sold by U.S. Steel Corp. This polyester oligomer has an acid number of 25 and a number average molecular weight of about 2400. This oligomer was made from isophthalic acid, maleic anhydride, diethylene glycol and propylene glycol), 400 g of styrene, 0.8 g of hydroquinone and 7.0 g of Zelec UN mold release (an organophosphate mold release agent sold by E. I. du Pont de Nemours, Wilmington, Del.).

EXAMPLE 1

A thermosetting resin composition was prepared by mixing 150 g of a polyester resin containing 30 weight percent styrene (MR 14017 as described in Control H), 45 g of the reaction product of 2,2-dimethyl-3-hydroxy propyl 2,2-dimethyl-3-hydroxypropionate and maleic anhydride (as prepared in Control A), 105 g of styrene and 0.9 g of Zelec UN mold release. The liquid mixture had a viscosity of 108 centipoises at 23° C.

The components of the mixture are shown in Table II.

EXAMPLES 2 TO 6

Resin formulations were prepared as in Example 1 by blending a polyester resin (MR 14017 as described in Control H), a maleic anhydride/polyol reaction product, styrene and a mold release agent.

Table II lists the amounts of polyester resin, the amount of maleic anhydride/polyol reaction product, the amount of styrene, the amount of mold release (Zelec UN), the type of polyol in the reaction product, and the Example by which the maleic anhydride/polyol reaction product was prepared.

TABLE II

| Example | 1 | 2 | 3 | 4 | 5 | 6 |
|---|---|---|---|---|---|---|
| Resin Formulation | | | | | | |
| Polyester (wt. %) | 35 | 28.8 | 25 | 25 | 25 | 25 |
| Maleic anhydride/polyol reaction product (wt. %) | 15 | 22.9 | 25 | 25 | 25 | 25 |
| Styrene (wt. %)[a] | 50 | 48.3 | 50 | 50 | 50 | 50 |
| Mold Release (phr)[b] | 0.3 | 0.5 | 0.5 | 0.5 | 0.8 | 0.5 |
| Type of polyol in the reaction product | 2,2-dimethyl-3-hydroxypropyl 2,2-dimethyl-3-hydroxypropionate | dipropylene glycol | 2-mole ethoxylate of 2,2-bis (4-hydroxyphenyl)-propane | 2-mole propoxylate of 2,2-bis (4-hydroxyphenyl) propane | Mixture of 2,2,4-trimethyl-1,3-pentanediol and propylene glycol | Mixture of 2,2-dimethyl-3-hydroxypropyl 2,2-dimethyl-3-hydroxypropionate and a polycaprolactone ester of trimethylol propane containing approximately 3.6 moles of caprolactone |
| Example by which the maleic anhydride/polyol reaction product is produced | Control A | Control B | Control C | Control D | Control E | Control G |

[a] includes contribution from the polyester resin.
[b] phr - parts by weight per 100 parts of resin.

CONTROL I

A thermosetting resin composition was prepared by mixing 882 g of a commercial polyester resin containing 32 weight percent styrene (GR 13017 sold by Hatco Division of W. R. Grace Co., Linden, N.J. This polyester oligomer has an acid number of 25 and a number average molecular weight of about 1900. This oligomer was made from maleic anhydride, isophthalic acid, propylene glycol and dipropylene glycol), 318 g of styrene and 6.0 g of Zelec UN mold release.

EXAMPLES 7 and 8

Resin formulations were prepared by mixing a commercial polyester resin (GR 13017 as described in Control I), the maleic anhydride/polyol reaction product, styrene and mold release agent.

Table III lists the amount of polyester resin, the amount of styrene, the amount of mold release (Zelec UN), the polyol in the reaction product, and the Example by which the maleic anhydride/polyol reaction product was prepared.

TABLE III

| Example | 7 | 8 |
|---|---|---|
| Resin formulation | | |
| Polyester (wt. %) | 25 | 25 |
| Maleic anhydride/polyol reaction product (wt. %) | 25 | 25 |
| Styrene (wt. %)[a] | 50 | 50 |
| Mold release (phr)[b] | 0.5 | 0.5 |
| Type of polyol in reaction product | Mixture of 2,2,4-trimethyl 1,3-pentanediol and propylene glycol | Mixture of 2,2-dimethylhydroxypropyl 2,2-dimethyl-3-hydroxypropionate and dipropylene glycol |
| Example by which the the maleic anhydride/polyol reaction product is produced | Control E | Control F |

[a] includes contribution from the polyester resin.
[b] phr is parts by weight per 100 parts of resin.

CONTROL J

A thermosetting resin composition was prepared by mixing 1000 g of a polyester resin containing 40 weight percent styrene (GR 13031 sold by Hatco Division of W. R. Grace Co., Linden, N.J. This polyester oligomer has an acid number of 32 and a number average molecular weight of about 1370. This oligomer was made by reacting maleic anhydride, propylene glycol and a small amount of phthalic anhydride), 200 g of styrene and 6.0 g of Zelec UN mold release agent.

EXAMPLES 9 AND 10

Resin formulations were prepared by mixing a commercial polyester resin (GR 13031 as described in Control J), maleic anhydride/polyol reaction product, styrene and mold release agent.

Table IV lists the amount of polyester resin, the amount of maleic anhydride/polyol reaction product, the amount of styrene, the amount of mold release (Zelec UN), the polyol in the reaction product, and the Example by which the maleic anhydride/polyol reaction product was prepared.

TABLE IV

| Example | 9 | 10 |
|---|---|---|
| Resin Formulation | | |
| Polyester (wt. %) | 25 | 25 |
| Maleic anhydride/polyol reaction product(wt. %) | 50 | 50 |
| Styrene(wt. %)[a] | 50 | 50 |
| Mold release(phr)[b] | 0.5 | 0.5 |
| Type of polyol in the reaction product | 2 mole propoxylate of 2,2-bis(4-hydroxyphenyl)propane | Mixture of 2,2,4-trimethyl 1,3-pentanediol and propylene glycol |
| Example by which the maleic anhydride/polyol reaction product is produced | Control D | Control E |

[a]Includes contribution from the polyester resin.
[b]phr - parts by weight per 100 parts of resin.

EXAMPLE 11

A series of seven unreinforced castings were prepared from the commercial polyester resin of Control H, (MR 14017) and the resin formulations prepared in Examples 1 to 6. The castings were prepared from 140 g portions of the polyester resin formulation of Control H and the formulations of Examples 2 to 6. These portions were mixed with 1 part by weight per 100 parts of resin of t-butylperbenzoate (with the exception of casting 3 wherein 0.9 part was used). Each mixture was poured into a mold having dimensions of 9×9×⅛ inches. The mold was made of glass plates separated by a ⅛ inch neoprene spacer. The glass plates were coated with Polyplastex 595 mold release (sold by Polyplastex United, Union, N.J.). The resin was heated at 65° C. for 16 hours, then at 90° C. for 3 hours and then at 125° C. for 4 hours. The castings obtained were clear and hard.

The castings were tested for the following properties: tensile strength, tensile modulus, and elongation according to ASTM D-638, and flexural strength and flexural modulus according to ASTM D-790.

Table V lists the Example by which the resin formulation was prepared, the polyol used in the maleic anhydride/polyol reaction product in the formulation, as well as the properties of the castings, i.e., tensile strength, tensile modulus, elongation and flexural strength and flexural modulus.

The data in the Table shows that the tensile properties of the castings prepared from the compositions of this invention have a wide range of values. The flexural properties of the castings of the Examples are more similar to those of Control H.

TABLE V

Properties of Castings Made From a Blend of a Polyester and Maleic Anhydride/Polyol Reaction Product

| Casting | 1 | 2 | 3 | 4 | 5 | 6 | 7 |
|---|---|---|---|---|---|---|---|
| Resin Formulation | | | | | | | |
| Example | Control M | 1 | 2 | 3 | 4 | 5 | 6 |
| Polyol | — | 2,2-dimethyl-3-hydroxy propyl 2,2-dimethyl-3-hydroxypropionate | dipropylene glycol | 2-mole ethoxylate of 2,2-bis(4-hydroxyphenyl)propane | 2-mole propoxylate of 2,2-bis(4-hydroxyphenyl)propane | Mixture of 2,2,4-trimethyl 1,3-pentanediol and propylene glycol | Mixture of 2,2-dimethyl-3-hydroxypropyl 2,2-dimethyl-3-hydroxypropionate and a polycaprolactone ester of trimethylol propane containing approximately 3.6 moles of caprolactone |
| Properties of Castings | | | | | | | |
| Tensile strength ($10^3$ psi) | 8.8 | 11.1 | 10.8 | 9.9 | 5.7 | 5.0 | 5.5 |
| Tensile modulus ($10^6$ psi) | 0.42 | 0.40 | 0.44 | 0.41 | 0.48 | 0.50 | 0.44 |
| Elongation (%) | 2.7 | 4.7 | 3.6 | 2.9 | 1.2 | 1.0 | 1.3 |
| Flexural strength ($10^3$ psi) | 15.3 | 17.2 | 15.3 | 16.5 | 16.1 | 13.3 | 17.3 |
| Flexural modulus ($10^6$ psi) | 0.51 | 0.54 | 0.54 | 0.55 | 0.55 | 0.58 | 0.52 |

EXAMPLE 12

A series of three unreinforced castings (castings 8 to 11) were prepared from the commercial polyester resin of Control I (GR 13017) and the resin formulations prepared in Examples 7 and 8. The castings were prepared from 140 g portions of the polyester resin of Control I and the formulations of Examples 7 and 8. These portions were mixed with 1 part by weight, per 100 parts of resin, of t-butyl perbenzoate and cured by the procedure as described in Example 11. The castings so formed were tested by the procedures as described in Example 11.

Table VI lists the Example by which the resin formulation was prepared, the polyol used in the maleic anhydride/polyol reaction product in the formulation, as well as the properties of the castings, i.e., tensile strength, tensile modulus, elongation and flexural strength and flexural modulus.

The data in the Table shows that the flexural properties of the Control are similar to those of the Examples.

TABLE VI

| Casting | 8 | 9 | 10 |
|---|---|---|---|
| Resin Formulation | | | |
| Example | Control I | 7 | 8 |
| Polyol | — | Mixture of 2,2,4-trimethyl-1,3-pentanediol and propylene glycol | Mixture of 2,2-dimethyl-3-hydroxypropyl 2,2-dimethyl-3-hydroxypropionate and dipropylene glycol |
| Properties of Castings | | | |
| Tensile strength ($10^3$ psi) | 6.4 | 4.1 | 5.5 |
| Tensile modulus ($10^6$ psi) | 0.43 | 0.40 | 0.41 |
| Elongation (%) | 1.6 | 1.0 | 1.4 |

TABLE VI-continued

| Casting | 8 | 9 | 10 |
|---|---|---|---|
| Flexural strength ($10^3$ psi) | 10.0 | 8.5 | 11.4 |
| Flexural modulus ($10^6$ psi) | 0.54 | 0.50 | 0.53 |

EXAMPLE 13

A series of three unreinforced castings (castings 11 to 13) were prepared from the polyester resin of Control J (GR 13031) and the resin formulations prepared in Examples 9 and 10. The castings were prepared from 140 g portions of the polyester resin of Control J and the formulations of Examples 9 and 10. These portions were mixed with 1 part by weight, per 100 parts of resin, of t-butyl perbenzoate and cured by the procedure as described in Example 11. The castings so formed were tested by the procedures as described in Example 11.

Table VII lists the Examples by which the resin formulation was prepared, the polyol used in the maleic anhydride/polyol reaction product in the formulation, as well as the properties of the castings, i.e. tensile strength, tensile modulus, elongation and flexural strength and flexural modulus.

(It is noted the casting of Control J cracked during cure and tensile strength, tensile modulus and elongation could not be determined on the portion remaining).

The data in the Table shows that the flexural properties of the castings of the compositions of this invention are greater than those of the Control. However, the flexural strengths for all castings in Table VII are lower than any of those in Tables V and VI.

t-butylperbenzoate (except for the formulations of Examples 9 and 10 which contained 0.9 and 1.0 parts, respectively).

The glass mat was type AKM chopped strand mat (1½ oz.sq. ft., sold by PPG Industries, Pittsburgh, Pa.).

The following procedure was used: 6 plies of glass mat with dimensions 6⅞×6⅞ inches and weighing 85 g was placed in a heated press having a cavity with dimensions of 7×7×⅛ inches. The mold was heated to 140° C. The press was closed and resin was injected into the web of fibers over a 5-second period. A hydrostatic pressure of 250 psi was maintained on the resin for 55 seconds and then the pressure was released. The part was maintained in the mold for an additional 60 seconds (total cure time was 2 minutes). Then the press was opened and a hot rigid part was removed. The part weighed 165 g.

The part was tested for the following properties: tensile strength, tensile modulus and elongation according to ASTM D-638 and flexural strength and flexural properties according to ASTM D-790. The glass contents of all samples were determined by ashing.

Table VIII lists the Example by which the resin formulation was prepared, the polyol used in the maleic anhydride/polyol reaction product in the formulation, the tensile strength, tensile modulus, elongation, flex-

TABLE VII

| Casting | 11 | 12 | 13 |
|---|---|---|---|
| Resin Formulation | | | |
| Example | Control J | 9 | 10 |
| Polyol | — | 2-mole propoxylate of 2,2-bis (4-hydroxyphenyl) propane | Mixture of 2,2,4-trimethyl 1,3-pentanediol and propylene glycol |
| Properties of Castings | | | |
| Tensile strength ($10^3$ psi) | — | 4.4 | 5.1 |
| Tensile modulus ($10^6$ psi) | — | 0.48 | 0.51 |
| Elongation (psi) | — | 1.0 | 1.0 |
| Flexural strength ($10^3$ psi) | 3.4 | 5.1 | 6.7 |
| Flexural modulus ($10^6$ psi) | 0.60 | 0.54 | 0.58 |

EXAMPLE 14

A series of six composites were prepared from the polyester resin of Control H (MR 14017) and the resin formulations prepared in Examples 2 to 6. The composites were prepared by injecting the resin formulations into a web of glass fibers in a heated mold. The resins contained 1.5 parts by weight, per 100 parts of resin, of ural strength and flexural modulus of the molded part and the glass content of the part.

The data in the Table shows that the flexural strength and modulus of the composites made with the compositions of this invention are significantly higher than those of the Control. Tensile properties of the composites of this invention are improved over those of the Control.

TABLE VIII

| Composite | 1 | 2 | 3 | 4 | 5 | 6 |
|---|---|---|---|---|---|---|
| Resin Formulation | | | | | | |
| Example | Control H | 2 | 3 | 4 | 5 | 6 |
| Polyol | — | dipropylene glycol | 2-mole ethoxylate of 2,2-bis(4-hydroxyphenyl) propane | 2-mole propoxylate of 2,2-bis(4-hydroxyphenyl) propane | Mixture of 2,2,4-trimethyl 1,3-pentanediol and propylene glycol | Mixture of 2,2-dimethyl-3-hydroxypropyl 2,2-dimethyl-3-hydroxypropionate and a polycaprolactone ester of trimethylol propane containing approximately 3.6 moles of caprolactone |
| Properties of Composites | | | | | | |
| Tensile strength ($10^3$ psi) | 18.3 | 24.2 | 28.7 | 22.2 | — | 25.2 |
| Tensile modulus ($10^6$ psi) | 1.17 | 1.45 | 1.50 | 1.35 | — | 1.49 |
| Elongation (%) | 2.0 | 1.8 | 2.3 | 1.9 | — | 1.9 |

TABLE VIII-continued

| Composite | 1 | 2 | 3 | 4 | 5 | 6 |
|---|---|---|---|---|---|---|
| Flexural strength ($10^3$ psi) | 25.0 | 38.4 | 41.7 | 35.6 | 42.7 | 34.8 |
| Flexural modulus ($10^6$ psi) | 1.28 | 1.64 | 1.62 | 1.54 | 1.85 | 1.41 |
| Glass content (wt. %) | 54 | 49 | 52 | 51 | 54 | 54 |

EXAMPLE 15

A series of three composites (7 to 9) were prepared from the commercial polyester resin of Control I (GR 13017) and the resin formulations prepared in Examples 7 and 8.

The composites were prepared by the procedure as described in Example 14.

Table IX lists the Example by which the resin formulation was prepared, the polyol used in the maleic anhydride/polyol reaction product in the formulation, as well as the properties of the molded part, i.e., tensile strength, tensile modulus, elongation, flexural strength and flexural modulus and the glass content of the part.

The data in the Table shows that the flexural strengths of the composites made from the compositions of this invention are improved over those of the Control. The flexural modulus of the composites made from compositions of this invention are also better, particularly when the glass content of the composites is considered.

TABLE IX

| Composite | 7 | 8 | 9 |
|---|---|---|---|
| Resin Formulation | | | |
| Example | Control I | 7 | 8 |
| Polyol | — | Mixture of 2,2,4-trimethyl 1,3-pentanediol and propylene glycol | Mixture of 2,2,-dimethyl-3-hydroxypropyl 2,2-dimethyl-3-hydroxypropionate and dipropylene glycol |
| Properties of Composites | | | |
| Tensile strength ($10^3$ psi) | 21.3 | 21.3 | 19.1 |
| Tensile modulus ($10^6$ psi) | 1.22 | 1.27 | 1.25 |
| Elongation (%) | 2.0 | 2.0 | 1.8 |
| Flexural strength ($10^3$ psi) | 27.8 | 32.7 | 35.0 |
| Flexural modulus ($10^6$ psi) | 1.47 | 1.56 | 1.53 |
| Glass content (wt. %) | 54 | 52 | 51 |

EXAMPLE 16

A series of composites (10 to 12) were prepared from the commercial polyester of Control J (GR 13031) and the resin formulations prepared from Examples 9 and 10.

The composites were prepared by the procedure as described in Example 14. The composites formed were tested by the procedures described in Example 14.

Table X lists the Example by which the resin formulation was prepared, the polyol used in the maleic anhydride/polyol reaction product in the formulation, as well as the properties of the molded part, i.e., tensile strength, tensile modulus, elongation, flexural strength and flexural modulus and the glass content of the part.

The data in the Table shows that flexural strength and flexural modulus, tensile strength and tensile modulus are improved in composites prepared from the compositions of this invention as compared to composite made from the composition of the Control.

TABLE X

| Composite | 10 | 11 | 12 |
|---|---|---|---|
| Resin Formulation | | | |
| Example | Control J | 9 | 10 |
| Polyol | — | 2-mole propoxylate of 2,2-bis (4-hydroxyphenyl) propane | Mixture of 2,2,4-trimethyl 1,3-pentanediol and propylene glycol |
| Properties of Composites | | | |
| Tensile strength ($10^3$ psi) | 20.2 | 24.5 | 23.7 |
| Tensile modulus ($10^6$ psi) | 1.29 | 1.48 | 1.43 |
| Elongation (%) | 2.0 | 1.9 | 2.0 |
| Flexural strength ($10^3$ psi) | 30.1 | 37.5 | 34.8 |
| Flexural modulus ($10^6$ psi) | 1.23 | 1.49 | 1.50 |
| Glass content (wt. %) | 53 | 54 | 52 |

EXAMPLE 17

A series of composites were prepared (composites 1, 6 and 13 to 15) to show the effect of varying the proportions of polyester oligomer and maleic anhydride/polyol-reaction product in the resin formulation on the properties of the composites made from the resin formulations.

The resin formulations contained the amount of polyester and the reaction product of maleic anhydride and polyol as shown in Table XI. The maleic anhydride/polyol reaction product was obtained by reacting maleic anhydride with a mixture of 2,2-dimethyl-3-hydroxypropyl 2,2-dimethyl-3-hydroxypropionate and a polycaprolactone ester of trimethylol propane containing approximately 3.6 moles of caprolactone (in a weight ratio of 51/49) in a molar ratio of one mole of maleic anhydride per mole of hydroxy group. The resin formulations also contained 50 weight percent styrene, 1.0 parts by weight, per 100 parts of resin, of Zelec UN mold release and 1.5 parts by weight per 100 parts of resin of t-butyl perbenzoate.

The polyester in the resin formulation is that described in Control H. Control K is the above-described maleic anhydride/polyol reaction product without polyester. Additionally, the properties of composite 6 (from Table VIII) prepared from the resin formulation of Example 6 are shown in Table XI.

The resin formulations were molded into composites by the procedure as described in Example 14. The composites were tested for flexural strength and modulus and the glass content of the composite was determined by ashing.

Table XI lists the amount of polyester and maleic anhydride/polyol reaction product in the formulation. Also, the flexural strength and modulus of the molded part and the glass content of that part are listed.

The data in the Table show that flexural properties are enhanced in the composites as the proportion of maleic anhydride/polyol reaction product is increased. An increase in flexural properties is observed at 12.5 weight percent of the reaction product in the total formulation even in a composite containing less glass.

TABLE XI

| Composite | 1 | 13 | 6 | 14 | 15 |
|---|---|---|---|---|---|
| Resin Formulation | | | | | |
| Polyester (wt. %) | 50 | 37.5 | 25 | 12.5 | 0 |
| Maleic anhydride/polyol | | | | | |
| Reaction product (wt. %) | 0 | 12.5 | 25 | 37.5 | 50 |
| | (Control H) | | | | (Control K) |
| Properties of Composites | | | | | |
| Flexural strength ($10^3$ psi) | 25.0 | 31.1 | 34.8 | 43.0 | 41.2 |
| Flexural modulus ($10^6$ psi) | 1.28 | 1.30 | 1.41 | 1.61 | 1.66 |
| Glass content (wt. %) | 54 | 50 | 54 | 54 | 51 |

EXAMPLE 18

This Example demonstrates the use of different type of glass reinforcement other than the AKM glass mat shown in the previous Examples.

Composites 16 and 17 were prepared using 140 g portions of the commercial polyester formulation of Control H (MR 14017) and the resin formulation prepared in Example 1. These portions were mixed with 1 part by weight, per 100 parts of resin, of t-butyl perbenzoate.

A mat made of one inch chopped glass roving (type 447 from Owens Corning fiberglass, Toledo, Ohio) was made by spraying the fibers onto a flat surface. A stream of excess binder consisting of a polyvinyl acetate latex (UCAR Latex 131 sold by Union Carbide Corporation) was deposited simultaneously in order to cause the fibers to stick together. After air drying for about 12 hours at room temperature, the mat contained 6 to 10 percent by weight of the polyvinyl acetate binder.

An 8×8 inch square of the mat weighing 103 g was placed into a heated press containing a cavity of approximate dimensions of 8×8×⅛ inches. The mold temperature was 130° C. The press was closed and a portion of the resin formulation was injected into the web of fibers. The resin penetrated the web and filled the mold. The injection took 10 seconds. A hydrostatic pressure of approximately 60 to 120 psi was applied for about 2 minutes and then released. The part was kept in the mold for an additional 3 minutes. Total cure time was 5 minutes. The mold was opened and a rigid part was removed which weighed 190 g.

The composites were tested for flexural strength and modulus and the glass content of the composites were determined by ashing.

Table XII lists the Example by which the resin formulation was prepared, the polyol used in the maleic anhydride/polyol reaction product in the formulation, the flexural strength and modulus of the molded part and the glass content of the part.

TABLE XII

| Composite | 16 | 17 |
|---|---|---|
| Resin Formulation | | |
| Example | Control H | 1 |
| Polyol | — | 2,2-dimethyl-3-hydroxypropyl 2,2-dimethyl-3-hydroxypropionate |
| Properties of Composite | | |
| Flexural strength ($10^3$ psi) | 26.2 | 38.6 |
| Flexural modulus ($10^6$ psi) | 1.36 | 1.54 |
| Glass content (wt. %) | 54 | 49 |

Controls L to P

The maleic anhydride/polyol reaction products prepared as described in Controls C to G were blended with styrene to form low viscosity liquid resins. Each resin contained 50 percent styrene by weight. It is noted that the maleic anhydride/polyol reaction products of Examples 1 and 2 did not form homogeneous, stable solutions containing 50 percent styrene which remained homogeneous for more than a few days.

Each resin was blended with 0.5 parts by weight per hundred parts of resin of Zelec UN mold release. Castings were made using the procedure of Example 11.

Table XIII lists the type of polyol in the reaction product and the Example by which the maleic anhydride/polyol reaction product was prepared and the number of the casting prepared.

TABLE XIII

| Example | Type of polyol in the Resin | Example by which the Maleic anhydride/polyol Reaction Product is Produced | Casting |
|---|---|---|---|
| Control L | Mixture of 2,2,4-trimethyl 1,3-pentanediol/and propylene glycol (75/25)$^a$ | Control E | 19 |
| Control M | Mixture of 2,2-dimethyl-3-hydroxypropyl 2,2-dimethyl-3-hy- | Control F | 20 |

TABLE XIII-continued

| Example | Type of polyol in the Resin | Example by which the Maleic anhydride/polyol Reaction Product is Produced | Casting |
|---|---|---|---|
| | droxypropionate and dipropylene glycol (75/25)[a] | | |
| Control N | 2-mole propoxylate of 2,2-bis-(4-hydroxyphenyl) propane | Control D | 21 |
| Control O | 2-mole ethoxylate of 2,2-bis-(4-hydroxyphenyl) propane | Control C | 22 |
| Control P | Mixture of 2,2-dimethyl-3-hydroxypropyl 2,2-dimethyl-3-hydroxypropionate and a polycaprolactone ester of trimethylol propane containing approximately 3.6 moles of caprolactone (51/49)[a] | Control G | 23 |

[a]These numbers represent a weight ratio.

EXAMPLE 19

Castings 19 to 23, prepared in Controls L to P, castings 4 to 7, prepared from the formulations of Examples 3 to 6, castings 9 and 10 prepared from the formulations of Examples 7 and 8 and castings 12 and 13, prepared from the formulations of Examples 9 and 10, were tested to determine their environmental resistance. All test samples had dimensions of 1×4×⅛ inches. They were immersed in water at 65° C. for 28 days to determine their weight gains.

Table XIV lists the type of polyol in the castings and the percent weight gain of samples containing the polyol/maleic anhydride product and no polyester (castings 19 to 23), and samples containing the polyol/maleic anhydride product blended with the polyesters of Control H (MR 14017), Control I (GR 13017), and Control J (GR 13031).

In the Table, the polyols in the polyol/maleic anhydride reaction product are identified as follows:

a—Mixture of 2,2,4-trimethyl 1,3-pentanediol and propylene glycol
b—Mixture of 2,2-dimethyl-3-hydroxypropyl 2,2-dimethyl-3-hydroxypropionate and dipropylene glycol
c—2-mole propoxylate of 2,2-bis(4-hydroxyphenyl)-propane
d—2-mole ethoxylate of 2,2-bis(4-hydroxyphenyl)-propane
e—Mixture of 2,2-dimethyl-3-hydroxypropyl 2,2-dimethyl-3-hydroxypropionate and a polycaprolactone ester of trimethylol propane containing approximately 3.6 moles of caprolactone The data in the Table shows that for a given polyol, the water sorption of Controls L through P (i.e. castings 19 through 23) is always greater than that of the blends of this invention. Therefore, the environmental resistance of the compositions of this invention is superior. Water sorption is a measure of dimensional stability in the part and reflects the degree of attack on the cured resin by the environment. This correlates with the retention of mechanical properties and degree of dimensional stability.

TABLE XIV

| | Percent Weight Gain[1] | | | |
|---|---|---|---|---|
| Type of Polyol | Polyol | Polyol and Polyester of Control H | Polyol and Polyester of Control I | Polyol and Polyester of Control J |
| a | 7.3 (19) | 5.0 (6) | 3.9 (9) | 4.5 (12) |
| b | 6.4 (20) | — | 3.4 (10) | — |
| c | 2.4 (21) | 2.0 (5) | — | 2.2 (13) |
| d | 3.2 (22) | 2.5 (4) | — | — |
| e | 6.0 (23) | 3.3 (7) | — | — |

[1]The casting number is given in parenthesis

What is claimed is:

1. A polymerizable composition comprising a mixture of:
(a) an unsaturated polyester, (b) a half ester characterized by the following empirical formula:

$$(HO-\overset{O}{\underset{\|}{C}}-CH=CH-\overset{O}{\underset{\|}{C}}-O\!\!\to_{\overline{n}}\!\!A\!\!\leftarrow\!\!OH)_m \quad (I)$$

wherein n is a number having an average value of about 1.5 to less than about 4, m is equal to the free valence of A less the average value of n, A is the hydroxyl-free residue of an organic polyol which contained from 2 to 4, inclusive, hydroxyl groups, OH, in formula (I), (c) maleic anhydride and (d) an ethylenically unsaturated monomer.

2. A composition as defined in claim 1 wherein the unsaturated polyester is the condensation product of at least one diol and at least one difunctional acid or anhydride.

3. A composition as defined in claim 2 wherein the diol is selected from ethylene glycol, diethylene glycol, propylene glycol, dipropylene glycol, 2,2,4-trimethyl-1,3-pentanediol, 1,3-butanediol, neopentyl glycol, and the alkoxylated derivatives of bisphenol-A.

4. A composition as defined in claim 2 wherein the difunctional acid or anhydride contains unsaturation.

5. A composition as defined in claim 4 wherein the unsaturated acid is maleic acid or fumaric acid.

6. A composition as defined in claim 4 wherein the unsaturated anhydride is maleic anhydride.

7. A composition as defined in claim 2 wherein the difunctional acid or anhydride is a mixture of saturated and unsaturated acids and anhydrides.

8. A composition as defined in claim 7 wherein the saturated acid is selected from phthalic acid, isophthalic acid, terephthalic acid and adipic acid.

9. A composition as defined in claim 7 wherein the saturated anhydride is phthalic anhydride.

10. A composition as defined in claim 1 wherein the organic polyol is selected from 2,2-dimethyl-3-hydroxypropyl 2,2-dimethyl-3-hydroxypropionate, 2,2,4-trimethyl 1,3-pentanediol, propylene glycol, dipropylene glycol, the ethylene oxide and propylene oxide adducts of 2,2-bis(4-hydroxyphenyl)propane, and a polycaprolactone ester of a polyol wherein from about 1 to about 5 moles of caprolactone are esterified with the polyol.

11. A composition as defined in claim 1 wherein the organic polyol comprises a mixture of polyols.

12. A composition as in claim 11 wherein the mixture of polyols contains 2,2,4-trimethyl-1,3-pentanediol.

13. A composition as in claim 12 which contains propylene glycol.

14. A composition as in claim 12 which contains a polycaprolactone ester of a polyol wherein from about 1 to about 5 moles of caprolactone are esterified with the polyol.

15. A composition as in claim 14 which contains a polycaprolactone ester of trimethylol propane wherein about 3.6 moles of caprolactone are esterified with trimethylol propane.

16. A composition as in claim 11 wherein the mixture of polyols contains 2,2-dimethyl-3-hydroxypropyl 2,2-dimethyl-3-hydroxyproionate.

17. A composition as in claim 6 which contains a polycaprolactone ester of a polyol wherein from about 1 to about 5 moles of caprolactone are esterified with the polyol.

18. A composition as in claim 17 which contains the polycaprolactone ester of trimethylol propane where about 3.6 moles of caprolactone are esterified with trimethylol propane.

19. A composition as in claim 16 wherein the mixture of polyols contains dipropylene glycol.

20. A composition as in claim 11 wherein the mixture of polyols contains the 2-mole ethoxylate of 2,2-bis(4-hydroxyphenyl)propane.

21. A composition as in claim 20 wherein the mixture of polyols contains 2,2-dimethyl-1,3-propanediol.

22. A composition as in claim 11 wherein the mixture of polyols contains the 2-mole propoxylate of 2,2-bis(4-hydroxyphenyl)propane.

23. A composition as in claim 22 wherein the mixture of polyols contains 2,2-dimethyl-1,3-propanediol.

24. A composition as defined in claim 1 wherein the ethylenically unsaturated monomer is styrene.

25. A composition as defined in claim 1 wherein the unsaturated polyester is present in amounts of from about 70 to about 3 weight percent.

26. A composition as defined in claim 25 wherein the unsaturated polyester is present in an amount of from about 65 to about 5 weight percent.

27. A composition as defined in claim 1 wherein the half ester of formula (I) and maleic anhydride is present in amounts of from about 3 to about 70 weight percent.

28. A composition as defined in claim 27 wherein the half ester of formula (I) and maleic anhydride is present in amounts of from about 5 to about 65 weight percent.

29. A composition as defined in claim 1 wherein the ethylenically unsaturated monomer is present in amounts of from about 20 to about 80 weight percent.

30. A composition as defined in claim 29 wherein the ethylenically unsaturated monomer is present in amounts of from about 25 to about 60 weight percent.

31. A composition as defined in claim 1 which contains a basic compound.

32. A cured molded article prepared from the composition of claim 1.

33. A cured molded article as defined in claim 32 wherein the molded article contains from about 15 to about 80 weight percent, of the weight of the molded article, of one or more fibers with a melting point or a glass transition temperature above about 130° C.

* * * * *